United States Patent [19]

Gorin

[11] 4,208,395

[45] Jun. 17, 1980

[54] REMOVAL OF SULFUR DIOXIDE FROM FLUE GAS

[75] Inventor: Everett Gorin, San Rafael, Calif.

[73] Assignee: Continental Oil Company, Stamford, Conn.

[21] Appl. No.: 966,546

[22] Filed: Dec. 5, 1978

[51] Int. Cl.² .............................................. C01B 17/04
[52] U.S. Cl. ................................ 423/567 A; 423/242
[58] Field of Search ................... 423/242, 567 A, 571, 423/551

[56] References Cited

U.S. PATENT DOCUMENTS

| | | | |
|---|---|---|---|
| 1,944,978 | 1/1934 | Hansen | 423/571 X |
| 3,937,787 | 2/1976 | Gorin et al. | 423/242 A |
| 3,987,147 | 10/1976 | Guerrieri | 423/242 A |
| 4,008,310 | 2/1977 | Gorin | 423/242 A |
| 4,079,119 | 3/1978 | Nicholson | 423/242 A |
| 4,122,148 | 10/1978 | Nicholson | 423/242 A |

*Primary Examiner*—G. O. Peters

*Attorney, Agent, or Firm*—F. Lindsey Scott; Mikesell, Jr., William A.

[57] ABSTRACT

An improvement is provided in the regeneration system of aqueous regenerative processes for the removal of $SO_2$ from $SO_2$-containing gas streams which have a scrubbing system containing (1) a scrubbing zone through which a recirculating stream of sodium or potassium thiosulfate solution continuously passes as a vehicle for the $SO_2$ absorbent, sodium or potassium carbonate, under conditions favorable to the formation of sulfite by the reaction of carbonate and $SO_2$ and (2) a thiosulfate generation zone in which the sulfite is converted by reaction with a sulfide to thiosulfate. The improvement comprises converting, in a regeneration system, the net make of thiosulfate to a mixture of sulfide and carbonate by first converting the thiosulfate to sulfate, then reducing the sulfate to sulfide; and thereafter partially carbonating the sulfide to form a mixture of sulfide and carbonate for return to the scrubbing system.

2 Claims, 2 Drawing Figures

REMOVAL OF SULFUR DIOXIDE FROM FLUE GAS

BACKGROUND OF THE INVENTION

1. Field of the Invention

The present invention relates to regenerative processes for removal of sulfur dioxide from gases which employ an aqueous absorbent containing sodium or potassium carbonate to convert sulfur dioxide to sulfite. The term "carbonate" as used herein referes to carbonate and bicarobonate, jointly and severally; and the term "sulfite" similarly refers to sulfite and bisulfite, jointly and severally.

2. Description of the Prior Art

The present invention is a proposed improvement in those regenerative processes for removing $SO_2$ from $SO_2$-containing gases which convert the $SO_2$ in a scrubbing circuit first to sulfite by means of an absorbent and then the sulfite to a thiosulfate by means of a sulfite-reducing agent in a recirculating aqueous solution of thiosulfate. The absorbent is sodium or potassium carbonate and the sulfite-reducing agent is a sulfide or mixture of sulfides of the same cation as the absorbent. The concentration of thiosulfate, also of the same cation as the absorbent, is maintained substantially constant by withdrawal from the recirculating aqueous solution of a minor portion which corresponds to the net make of thiosulfate. The withdrawn portion is subjected to one or more regenerative steps to produce a mixture of carbonate and sulfide for return in the proper amounts to the recirculating solution of thiosulfate for reuse therein as absorbent and sulfite reducing agent respectively.

More particularly, the present invention is a proposed improvement in the regeneration system of the process described and claimed in U.S. Pat. No. 3,937,787. The process covered by said patent comprises the following absorption and regeneration operations:

(1) maintaining in a scrubbing circuit a recirculating aqueous solution which contains sodium or potassium thiosulfate in a concentration of at least 10 percent by weight of the solution;

(2) maintaining a gas scrubbing zone in said scrubbing cirucit wherein the $SO_2$-containing gas passes in intimate contact with sodium or potassium carbonate under sulfite-forming conditions to thereby convert the $SO_2$ to sulfite;

(3) regulating the amount of sulfite in the recirculating aqueous solution so that its concentration is always less than 5 percent by weight thereof;

(4) converting the sulfite formed in the scrubbing zone to thiosulfate while in the scrubbing circuit but in a sulfite-reduction zone separate from the scrubbing zone, by means of a sulfide or mixture of sulfides;

(5) withdrawing a minor portion or slip stream of the recirculating aqueous solution from the scrubbing circuit to a regeneration system wherein thiosulfate contained in the slip stream is converted to a mixture of carbonate and sulfide; and (6) returning to the scrubbing circuit a regenerated aqueous stream containing in admixture the sulfide and carbonate in the proper ratio.

The proper ratio (designated R and sometimes called "Acceptability Ratio") of sulfide and carbonate in the regenerated aqueous solution is defined as follows:

$$R = \frac{2(S°) + 3(S^{-2})}{\Sigma M}$$

where
- $(S°)$ = gram atoms sulfur with valence number zero per 100 grams solution;
- $(S^{-2})$ = gram atoms sulfur with valence number equal to $-2$ per 100 grams solution;
- $\Sigma M$ = gram atoms of M per 100 grams solution present in said aqueous solution as MHS, $M_2S$, $M_2S_x$, $M_2CO_3$, $MHCO_3$, MOH; and
- M = Na or K In the foregoing definition of the Acceptability Ratio, the cation M fed to the system as MOH and/or $M_2CO_3$ to make up the loss of M from the system is included.

The conversion of thiosulfate to the desired mixture of sulfide and carbonate may be effected, as taught in the above-cited U.S. Pat. No. 3,937,787, by reaction of the thiosulfate with a reducing gas containing CO as the principal reductant. To the best of my knowledge, this reaction, although demonstrated in laboratory and pilot plant, has not yet been used commercially. A process which is presently used in the paper industry is the so-called molten salt sulfate reduction process. Because of its proven commercial feasibility, it is desirable to adapt it, if possible, to the conversion of thiosulfate to a mixture of sulfide and carbonate of desired relative proportions for use in the $SO_2$ removal processes described above.

SUMMARY OF THE INVENTION

In accordance with the present invention, thiosulfate is converted to a mixture of sulfide and carbonate having an Acceptability Ratio no greater than 1, and preferably between 0.75 and 0.98 by the performance of the following series of sequential steps expressed in terms of the principal reaction occurring in each step.

$$SO_2 + 2M_2S_2O_3 = 3S + 2M_2SO_4 \tag{1}$$

$$M_2SO_4 + 2C = M_2S + 2CO_2 \tag{2}$$

$$M_2S + CO_2 + H_2O = MSH + MHCO_3 \tag{3}$$

Each of the foregoing reactions is discussed separately in the following appropriately headed sections.

$$SO_2 + 2M_2S_2O_3 = 3S + 2M_2SO_4 \tag{1}$$

In this reaction gaseous $SO_2$ obtained from any suitable source is reacted with the aqueous thiosulfate under elevated temperatures and pressure to assure the production of the sulfur in a molten state, whereby it is readily separated from the aqueous sulfate solution. This reaction is well-known. A suitable temperature and a suitable pressure, for example, are 300° F. (150° C.) and 100 psig (8 atm), respectively.

$$M_2SO_4 + 2C = M_2S + 2CO_2 \tag{2}$$

In this reaction, carbon, e.g. coal, is reacted with the dried sulfate which is maintained in a molten state to yield $M_2S$ in molten state and gaseous $CO_2$. Again, this is a well-known reaction. A suitable temperature and a suitable pressure are, for example, 1800° F. (980° C.) and 30 psig (3 atm), respectively.

$$M_2S + CO_2 + H_2O = MSH + MHCO_3 \tag{3}$$

In this reaction, still another well-known reaction, the cooled solid sulfide is partially carbonated by reaction with $CO_2$ and $H_2O$ at elevated temperature. A suitable temperature is 200° F. (95° C.); pressure may be atmospheric. A number of side reactions occur whose significance depends upon the amount of carbon dioxide and steam used. Variation of such amounts permits ready control of the ratio of sulfide and carbonate produced. These side reactions are:

$$M_2S + CO_2 + H_2O = M_2CO_3 + H_2S \tag{3a}$$

$$M_2CO_3 + CO_2 + H_2O = 2MHCO_3 \tag{3b}$$

$$MSH + CO_2 + H_2O = MHCO_3 + H_2S \tag{3c}$$

$$MHCO_3 + MSH = M_2CO_3 + H_2S \tag{3d}$$

A high partial pressure of $CO_2$ favors conversion of sulfides to $H_2S$ and carbonate, but the conversion is limited by the partial pressure of $H_2S$ allowed to develop, i.e. by the quantities of $CO_2$, $H_2O$ and $M_2S$ present in the reaction zone. Thus, it will be readily apparent that any desired value of the Acceptability Ratio may be obtained by suitable selection of conditions.

In a preferred embodiment, reactions (2) and (3), and side reactions (3a), (3b), (3c) and (3d) are accomplished in a molten salt reductor to produce carbonates and sulfides in the desired Acceptability Ratio. Such is accomplished by proper adjustment of the steam and carbon dioxide partial pressures in the outlet gas from the molten salt reductor. The outlet gas is adjusted to an equilibrium constant value greater than about 0.08 atm as defined by the equation:

$$K_{(eq)} = \frac{P_{(H_2O)} \cdot P_{(CO_2)}}{P_{(H_2S)}}$$

where
$P_{(H_2O)}$ = partial pressure of water (atm)
$P_{(CO_2)}$ = partial pressure of $CO_2$ (atm)
$P_{(H_2S)}$ = partial pressure of $H_2S$ (atm)
Preferably the value of $K_{(eq)}$ is from about 0.1 to about 0.2 atm. By such an adjustment, carbonates and sulfides are produced in the desired acceptability ratio from the molten salt reductor.

PREFERRED EMBODIMENT

A. Absorption

Figure 1:
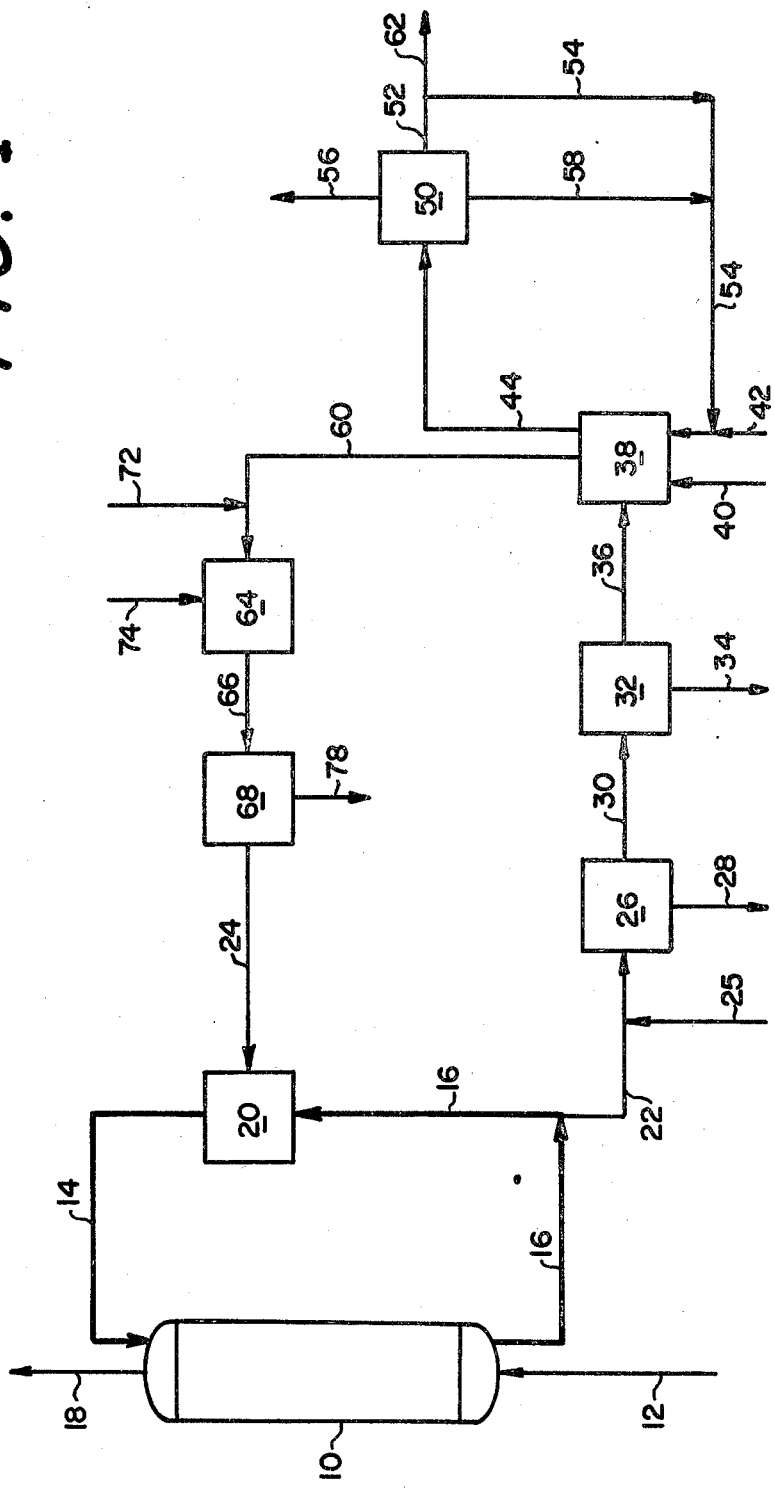
FIG. 1 is a schematic flowsheet showing a preferred embodiment of the present invention.

FIG. 1 represents a preferred embodiment of the process of this invention. The $SO_2$-absorbent which is preferred for use in the scrubbing zone is potassium carbonate, i.e. $K_2CO_3$ or $KHCO_3$, or mixtures thereof, because of the high solubility of potassium thiosulfate in water, thereby permitting the maintenance of a high concentration thereof in the scrubbing zone without fear of precipitation of the thiosulfate.

Referring to FIG. 1, a flue gas is introduced into the bottom of an absorber or scrubber tower 10 through an inlet conduit 12. The composition of a typical flue gas from a coal-fired power station using coal with a sulfur content of 2.46 weight percent of the moisture-free coal is as follows, in volume percent: 74.63% N; 13.98% $CO_2$; 3.30% $O_2$; 0.17% $SO_2$; and 7.92% $H_2O$. The scrubber 10 may be, for example, a conventional countercurrent or concurrent packed tower, spray tower, or any other suitable scrubbing apparatus; but the conventional countercurrent packed tower is preferred. Aqueous absorbent containing the $SO_2$-absorbent in a thiosulfate solution is continuously fed through a conduit 14 into the top of the tower 10.

A typical composition of absorbent fed through conduit 14 during normal operation of the recirculatory scrubbing system is as follows: $K_2S_2O_3$—50 percent by weight; $K_2CO_3$ and $KHCO_3$—0.5 percent by weight; sulfites expressed as $KHSO_3$—approximately 1.5 percent by weight; and $K_2SO_4$—1 percent by weight, with the balance water. The flue gas is passed upwardly in countercurrent flow to the aqueous absorbent which enters the top of the tower. The temperature within the tower is maintained at about 135° F. The principal reactions occurring in the scrubber are the following:

$$K_2CO_3 + SO_2 = K_2SO_3 + CO_2 \tag{4a}$$

$$K_2SO_3 + SO_2 + H_2O = 2KHSO_3 \tag{4b}$$

$$K_2CO_3 + 2SO_2 + H_2O = 2KHSO_3 + CO_2 \tag{4c}$$

$$KHCO_3 + SO_2 = KHSO_3 + CO_2 \tag{4d}$$

$$2KHCO_3 + SO_2 = K_2SO_3 + 2CO_2 + H_2O \tag{4e}$$

The pH is maintained at about 7 in the stream leaving the tower through a conduit 16 by control of carbonate concentration in the fresh absorbent solution. The liquid entering the tower through conduit 14 generally will be from 0.2 to 0.8 units higher in pH depending on the liquid circulation rate.

The range of liquid circulation rates through conduit 16 is suitably between 2 and 15 gallons per 1000 cubic feet (0.2 to 2.0 l. per 1000 l.) e.g. 10 gallons per 1000 cubic feet (1.33 l. per 1000 l.) of gas entering the tower through conduit 12. Substantially $SO_2$-free flue gas exits through a conduit 18.

The effluent stream leaving the bottom of the scrubber 10 contains very little unreacted $K_2CO_3$ or $KHCO_3$ since these are converted to sulfite. The sulfite is typically a mixture of $K_2SO_3$ and $KHSO_3$. The ratio of sulfite to bisulfite increases with pH. At a pH of 7.0, the molar ratio of sulfite to bisulfite is approximately one. The $K_2S_2O_3$ concentration remains essentially unchanged, as does that of the formate. Thus, the carbonate concentration has dropped close to zero, while the sulfite concentraion, expressed as weight percent equivalent $KHSO_3$, has increased to 2.0 weight percent. There is a small amount of sulfate in the effluent spent absorbent solution, e.g. about one percent or less of the sulfur absorbed.

The major portion of the effluent stream leaving the scrubber is conducted by the conduit 16 to a thiosulfate generator 20. A minor portion, or slip stream as it is generally called, is withdrawn through a conduit 22 to the regeneration system.

The efficiency of absorption of $SO_2$ and the composition of the scrubbing product are largely determined by the feed rate and composition of the regenerated solution entering the scrubbing system through a conduit 24. The solution contains principally potassium carbonate ($KHCO_3$ and $K_2CO_3$) and potassium sulfide. The latter is principally KHS along with small amounts of other potassium sulfides and polysulfides. The KHS as well as the other sulfides react rapidly in the thiosulfate generator 20 with the sulfite in the effluent scrubber solution. The principal reaction in the thiosulfate generator is:

$$2KHSO_3 + KSH = 3 \tfrac{1}{2} K_2S_2O_3 + 3/2 H_2O \tag{5}$$

This reaction occurs rapidly at the same or slightly higher temperature than that used in the scrubbing tower. Sufficient residence time is provided in thiosulfate generator 20 to provide for complete consumption of the KSH. The latter is essential to avoidance of $H_2S$ evolution into the treated flue gas, and is assured by maintaining a small excess of $KHSO_3$ that is more than enough to react with the KHS. The reaction rate decreases with increasing pH and, for this reason, the operating pH should be maintained below [in the thiosulfate generator 20. A residence time of 0.2–5 minutes is usually sufficient to provide for complete consumption of KSH when the pH of the solution in the thiosulfate generator is in the preferred range of 6.7–7.8, for example, 7.5.

Efficient absorption of $SO_2$ in the scrubber 10 is obtained when the feedrate of carbonate (expressed as $K_2CO_3$) through conduit 24 is greater than ½ mol/mol $SO_2$ fed into conduit 12. However, the feedrate of $K_2CO_3$ should be less than 1 mol/mol $SO_2$ fed because, if it is not, the pH of the solution entering the scrubber through conduit 14 will exceed the prescribed maximum valve of 8.

Similarly, the mol ratio of sulfide (expressed as KSH) to carbonate (expressed as $K_2CO_3$) in the regenerated solution entering the thiosulfate generator 20 through conduit 24 should not exceed the maximum value of 1.0, and should perferably be below this value to provide for the presence of $KHSO_3$ in the effluent solution from the thiosulfate generator. On the other hand, the molar ratio of KSH to $K_2CO_3$ must not be so low that the sulfite concentration will build up to an unacceptably high value with resultant formation of undesirably $K_2SO_4$. The molar ratio of KSH to $K_2CO_3$ in the solution entering the thiosulfate generator should be in the range of about 0.75 to 0.98.

As previously indicated, the regenerated solution entering the thiosulfate generator through conduit 24 will generally contain $KHCO_3$, $K_2S_x$ and small amount of $K_2S$, in addition to $K_2CO_3$ and KSH. The relationships of these compounds to each other are defined as follows:

Efficient absorption of $SO_2$ in the scrubber while maintaining the desired pH requires that, in the regenerated solution in conduit 24, the ratio $$(2 \times \text{mols } K_2CO_3 + \text{mols } KHCO_3)/\text{mols } SO_2$$

should be greater than one, but less than two. Similarly, conversion of the absorbed $SO_2$ to $K_2S_2O_3$ via sulfite reduction without evolution of $H_2S$ into the treated flue gas requires that the carbonates and sulfides in the regenerated solution in conduit 24 have an Acceptability Ratio, R, which is no greater than one and is preferably within the range of 0.75 to 0.98.

B. Regeneration

The spent effluent absorbent solution from the scrubbing zone 10 is pumped through conduit 16 to a point where a slip stream, for example 1 part per 60 parts of the main recirculating stream, is withdrawn by a conduit 22. Sulfur dioxide gas is introduced into the aqueous slip stream through a conduit 25. The $SO_2$ which readily dissolves in the aqueous solution is reacted with the thiosulfate in an autoclave 26 in acccordance with the following equation:

$$SO_2 + 2K_2S_2O_3 = 3S + 2K_2SO_4 \tag{6}$$

The reaction is conducted at a temperature above the melting point of sulfur, for example 300° F. (150° C.), and at an elevated pressure sufficient to maintain an aqueous solution of $K_2SO_4$, for example 100 psig (8 atm). The molten sulfur readily separates from the aqueous solution and is withdrawn through a conduit 28.

The aqueous sulfate solution is transferred through a conduit 30 to a crystallizer 32. The latter serves in well-known manner to effect selective crystallization of the $K_2SO_4$ from the cooled aqueous solution. The aqueous liquor is withdrawn from the crystallizer through a conduit 34 to serve as a quenching agent, as will later appear. The crystallized $K_2SO_4$ which is readily separated from the liquor in the crystallizer is conveyed by any suitable means 36 to a molten salt reductor 38.

The molten salt reductor 38 is operated so as to maintain the $K_2SO_4$ above its melting point. A suitable temperature and pressure are 1800° F. (980° C.) and 30 psig (3 atm), respectively. Finely divided coal is introduced through a conduit 40, and oxygen and steam are introduced through conduit 42. The desired temperature is maintained by partial oxidation of the coal. The principal reaction is the following:

$$K_2SO_4 + 2C = K_2S + 2CO_2 \tag{7}$$

However, a secondary but significant reaction occurs which is the following:

$$K_2S + CO_2 + H_2O = K_2CO_3 + H_2S \tag{8}$$

The carbonate produced in reaction (8) serves as a melting point depressant and catalyst for the reduction of $K_2SO_4$ by carbon in the molten salt bath. The effluent gas is discharged through a conduit 44. After removal of the $H_2S$ by any suitable $H_2S$ recovery means 50, the sulfur-free gas is discharged as a suitable fuel gas through a conduit 52 except for a portion which is recycled through a conduit 54 to the oxygen-steam line 42, to serve as fuel. $H_2S$ is recovered from $H_2S$ recovery 50 via a line 56 and optionally passes to further processing (not shown) to produce elemental sulfur or other sulfur-containing products. $H_2S$ may be recycled to line 54 if desired via a line 58. The flow of gas through line 54 is regulated to produce a gaseous stream exiting reductor 38 via line 44 wherein the equilibrium constant $K_{(eq)}$, defined as $$K_{(eq)} = \frac{P_{(H_2O)} \cdot P_{(CO_2)}}{P_{(H_2S)}}$$

where
$P_{(H_2O)}$ is the partial pressure of water,
$P_{(CO_2)}$ is the partial pressure of $CO_2$, and
$P_{(H_2S)}$ is the partial pressure of $H_2S$,
is greater than 0.08 atm and preferably is from about 0.1 to 0.2 atm.

When the equilibrium constant is mantained within the desired range, a stream of molten metal carbonate and metal sulfides is produced in reductor 38 and recovered via a line 60 wherein the carbonates and sulfides are produced in a ratio suitable for recycle to zone 20, i.e. in an acceptability ratio no greater than 1.0. Excess desulfurized gas may be vented as required via a line 62 and in some instances the gas so vented may be suitable for use as a fuel. As indicated previously, H₂S may be recovered via line 56 and sent to further processing. The amounts of sulfur so recovered, correspond generally to the quantities recovered in tower 10 less process losses, etc.

The molten mixture in line 60 is passed to a quench zone 64 where it is dissolved in water, introduced via a line 74, by means known to the art. The water may include the aqueous stream recovered from zone 32 via line 34. The aqueous stream of carbonates and sulfides is then passed via a line 66 to a filtration or solids separation zone 68 where any insoluble materials such as ash from the coal consumed in zone 38 or the like are removed via a line 78 prior to passing the aqueous carbonates and sulfides to zone 20 via line 24. Quantities of sulfides, carbonates or mixtures thereof may be added as required via line 72. Clearly the addition of the sulfides or carbonates or the removal of same is accomplished at any convenient process step intermediate zone 38 and zone 20 by means known to those skilled in the art.

Figure 2:
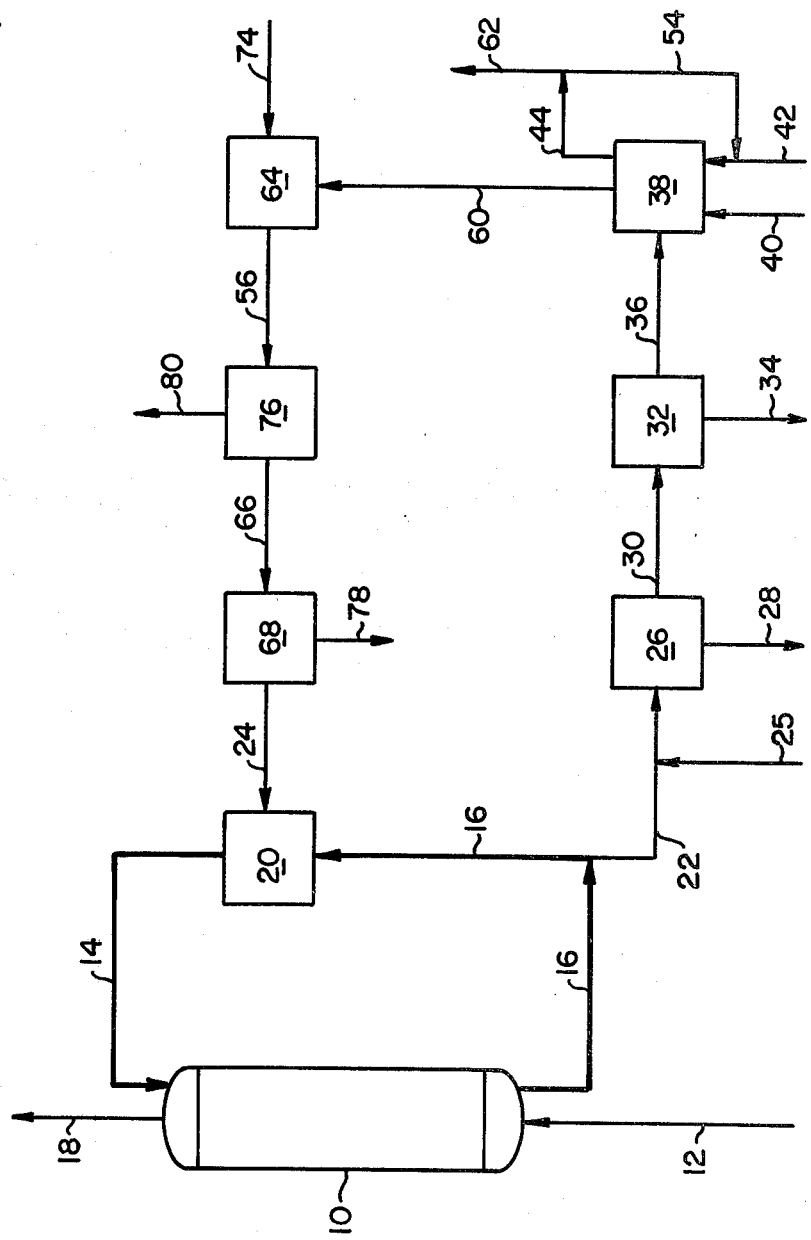
FIG. 2 is a schematic flowsheet of a further embodiment of the present invention.

In the embodiment shown in FIG. 2, the operation of the process is the same as in FIG. 1 up to the regeneration step. In the regeneration step, the effluent gas is discharged via conduit 44 and after removal of the H₂S by any suitable means (not shown), the sulfur-free gas is discharged as a suitable fuel gas through conduit 62 except for a portion which is recycled through a conduit 54 to oxygen steam line 42 to serve as fuel. The desired product K₂S is withdrawn in a molten state through a conduit 60. The molten K₂S product is mixed, and thereby cooled, in a suitable quenching zone 64 with the relatively cool aqueous quenching liquor discharged through conduit 34 from the crystallizer 32. The quenching liquor and any necessary make-up water is introduced into the quenching zone 64 by a conduit 74. The cooled K₂S product is conducted by a conduit 56 to a carbonation zone 76 where conditions are maintained which favor the following principal reaction:

$$K_2S + CO_2 + H_2O = KSH + KHCO_3 \qquad (9)$$

A suitable temperature for this reaction of 200° F. (95° C.); the pressure is atmospheric. The Acceptability Ratio, R, for the mixture of sulfide and carbonate obtained as the product from this carbonation zone 76 is regulated by control of the side reactions that occur in this zone. Those side reactions are:

$$K_2S + CO_2 + H_2O = K_2CO_3 + H_2S \qquad (10a)$$

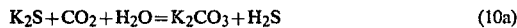

$$K_2CO_3 + CO_2 + H_2O = 2KHCO_3 \qquad (10b)$$

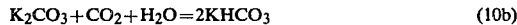

$$KSH + CO_2 + H_2O = KHCO_3 + H_2S \qquad (10c)$$

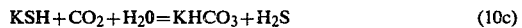

$$K_2CO_3 + H_2S = KHCO_3 + KSH \qquad (10d)$$

These side reactions are controlled by adjustment of the amount of CO₂ and steam employed. The steam may be that resulting from heating the aqueous quench liquor and by supplemental steam introduced into the carbonation zone. Increasing the amounts of CO₂ and H₂O favors the side reactions. The H₂S produced is discharged through a conduit 80.

The aqueous solution of sulfide and carbonate is transferred through a conduit 66 to a filtration or other suitable solids separation zone 68. Any insoluble solids, especially ash from the coal used in the reductor are removed at this point through a conduit 78. The regenerated aqueous solution is then returned to the scrubbing circuit through conduit 24.

By the variation of the process shown in FIG. 2, improved control of the Acceptability Ratio R is accomplished.

According to the provisions of the patent statutes, I have explained the principle, preferred construction, and mode of operation of my invention and have illustrated and described what I now consider to represent its best embodiment. However, I desire to have it understood that within the scope of the appended claims, the invention may be practised otherwise than as specifically illustrated and described.

I claim:

1. In a regenerative process for the removal of SO₂ from an SO₂-containing gas which comprises the following essential operations:

(a) maintaining in a scrubbing system a scrubbing zone in which said SO₂-containing gas is continuously contacted by aqueous sodium or potassium carbonate solution under sulfite-forming conditions, to thereby remove SO₂ from said gas by conversion of SO₂ to sulfite;

(b) maintaining in said scrubbing system a separate thiosulfate generation zone in which effluent sulfite solution from said scrubbing zone is continuously contacted by an aqueous solution of sulfide under thiosulfate-forming conditions to convert sulfite to thiosulfate;

(c) maintaining a continuous circulation of aqueous thiosulfate solution of substantially constant thiosulfate concentration from said thiosulfate generation zone to said scrubbing zone in said scrubbing system; and (d) maintaining a regeneration system in which thiosulfate contained in a slip stream from said scrubbing system is converted to a mixture of sulfide and carbonate in the following ratio, R:

$$R = \frac{2(S°) + 3(S^{-2})}{\Sigma(M)}$$

where the valve of R is no greater than 1;
(S°) = gram atoms sulfur with valence number zero per 100 grams of solution;
(S⁻²) = gram atoms of M per 100 grams of solution present in said solution as MHS, M₂S, M₂S$_x$, M₂CO₃, MHCO₃, MOH; and
M = Na or K, the improvement in said regeneration system which comprises:

(1) reacting the thiosulfate in said slip stream with SO₂ gas at a tempreature greater than about 300° F. and at a pressure sufficient to maintain an aqueous solution of M₂SO₄ in the reaction zone to produce an aqueous solution containing M₂SO₄ and molten S, and separately recovering said molten S and said aqueous solution containing M₂SO₄;

(2) reducing, said M₂SO₄ to M₂S by reaction with coal;

(3) carbonating, by reaction with CO₂ and H₂O, the M₂S to a mixture of sulfide and carbonate having a ratio, R, no greater than 1.

2. The process according to claim 1 wherein M is potassium.

* * * * *